(12) United States Patent
Liu

(10) Patent No.: US 10,660,075 B2
(45) Date of Patent: May 19, 2020

(54) CHANNEL STATE INFORMATION CSI SENDING METHOD, CHANNEL STATE INFORMATION CSI RECEIVING METHOD, TERMINAL, AND BASE STATION

(71) Applicant: Huawei Technologies Co., Ltd., Shenzhen (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 15/983,675

(22) Filed: May 18, 2018

(65) Prior Publication Data

US 2018/0270808 A1    Sep. 20, 2018

Related U.S. Application Data

(63) Continuation of application No. PCT/CN2015/095170, filed on Nov. 20, 2015.

(51) Int. Cl.
*H04W 72/04* (2009.01)
*H04L 1/00* (2006.01)
(Continued)

(52) U.S. Cl.
CPC ...... *H04W 72/0413* (2013.01); *H04B 5/0043* (2013.01); *H04B 7/0413* (2013.01);
(Continued)

(58) Field of Classification Search
CPC . H04W 72/0413; H04B 7/0626; H04L 1/0026
See application file for complete search history.

(56) References Cited

U.S. PATENT DOCUMENTS 9,131,405 B2 *   9/2015   Park ............... H04B 7/024
2012/0140649 A1   6/2012   Choudhury et al.
(Continued)

FOREIGN PATENT DOCUMENTS

CN   102237984 A   11/2011
CN   102638337 A    8/2012
(Continued)

OTHER PUBLICATIONS

R4-111389 NEC et al., "Feature usefulness of UE-selected subband CQI/PMI reporting," 3GPP TSG-RAN WG4 Meeting #58,Taipei, Taiwan, Feb. 21-25, 2011, 4 pages.
(Continued)

*Primary Examiner* — Hassan Kizou
*Assistant Examiner* — Deepa Belur
(74) *Attorney, Agent, or Firm* — Leydig, Voit & Mayer, Ltd.

(57) ABSTRACT

Embodiments of the present disclosure provide a channel state information (CSI) sending method, a CSI receiving method, a terminal, and a base station. The terminal selects a target CSI process from N CSI processes. The terminal sets a CSI reporting mode corresponding to the target CSI process, and sends, based on the CSI reporting mode, a CSI corresponding to the CSI process. The terminal can set a CSI reporting mode corresponding to a CSI process, and send, based on the set CSI reporting mode, a CSI corresponding to the CSI process. However, in the prior art, only the base station configures a CSI reporting mode corresponding to each CSI process. Therefore, flexibility is increased.

20 Claims, 3 Drawing Sheets

(51) Int. Cl.
  *H04B 7/06* (2006.01)
  *H04B 5/00* (2006.01)
  *H04B 7/0413* (2017.01)
  *H04L 5/00* (2006.01)
  *H04W 72/02* (2009.01)
  *H04W 72/08* (2009.01)
  *H04W 88/06* (2009.01)

(52) U.S. Cl.
  CPC ............ *H04B 7/0626* (2013.01); *H04L 1/00* (2013.01); *H04L 1/0026* (2013.01); *H04L 5/0057* (2013.01); *H04W 72/02* (2013.01); *H04W 72/085* (2013.01); *H04W 88/06* (2013.01)

(56) References Cited

U.S. PATENT DOCUMENTS

| | | | |
|---|---|---|---|
| 2013/0044624 A1 | 2/2013 | Su et al. | |
| 2014/0323143 A1* | 10/2014 | Jung | H04B 7/0617 455/452.1 |
| 2015/0222340 A1 | 8/2015 | Nagata et al. | |
| 2015/0288433 A1 | 10/2015 | Onggosanusi et al. | |
| 2015/0341093 A1* | 11/2015 | Ji | H04B 7/0478 375/267 |
| 2016/0094279 A1* | 3/2016 | Prasad | H04B 7/024 370/329 |
| 2016/0191273 A1 | 6/2016 | Nagata et al. | |
| 2017/0310384 A1* | 10/2017 | Park | H04B 7/26 |
| 2018/0076870 A1* | 3/2018 | Kim | H04B 7/04 |
| 2018/0220406 A1* | 8/2018 | Mizusawa | H04B 7/04 |
| 2018/0234154 A1* | 8/2018 | Chen | H04B 7/0417 |

FOREIGN PATENT DOCUMENTS

| | | |
|---|---|---|
| CN | 103580739 A | 2/2014 |
| CN | 104604277 A | 5/2015 |

OTHER PUBLICATIONS

3GPP TS 36.213 V12.7.0 (Sep. 2015);3rd Generation Partnership Project;Technical Specification Group Radio Access Network;Evolved Universal Terrestrial Radio Access (E-UTRA);Physical layer procedures(Release 12),total 241 pages.

* cited by examiner

CHANNEL STATE INFORMATION CSI SENDING METHOD, CHANNEL STATE INFORMATION CSI RECEIVING METHOD, TERMINAL, AND BASE STATION

CROSS-REFERENCE TO RELATED APPLICATIONS

This application is a continuation of International Application No. PCT/CN2015/095170, filed on Nov. 20, 2015, the disclosure of which is hereby incorporated by reference in its entirety.

TECHNICAL FIELD

The present disclosure relates to the field of communications technologies, and in particular, to a channel state information (CSI) sending method, a CSI receiving method, a terminal, and a base station.

BACKGROUND

A MIMO (multiple-input multiple-output) technology is widely applied to wireless communications systems to expand a system capacity and ensure cell coverage. For example, multiple-antenna-based transmit diversity, open/closed-loop spatial multiplexing, and DM-RS-based multi-stream transmission are used for downlink in an LTE (Long Term Evolution) system.

A main process of the DM-RS-based (demodulation reference signal-based) multi-stream transmission is as follows:

Step 1: A base station sends configuration information to a terminal.

Step 2: The terminal performs channel measurement based on the configuration information sent by the base station, and feeds back CSI obtained through measurement to the base station.

Step 3: The base station performs downlink scheduling based on the CSI fed back by the terminal, and sends a physical downlink shared channel (PDSCH) to the terminal based on a scheduling result using a DM-RS.

Currently, two-dimensional beamforming is used for the DM-RS-based multi-stream transmission. That is, a transmit antenna is placed only horizontally, and can generate a beam only in a horizontal direction, as shown in FIG. 1. To further improve multiple-antenna system performance, a three-dimensional beamforming technology emerges accordingly. In comparison with the current two-dimensional beamforming, a degree of freedom in a vertical direction is added in the three-dimensional beamforming. In this way, multiplexing can be performed for more terminals on a same time-frequency resource. Different terminals are distinguished from each other by using a beam in the vertical direction or the horizontal direction, so as to further increase resource utilization or spectral efficiency.

For both the two-dimensional beamforming and the three-dimensional beamforming, the base station usually needs to configure, for each terminal, a plurality of sets of measurement reference signal resources for which a precoding matrix has been used, so that the terminal obtains a set of optimal measurement reference signal resources by measuring the plurality of sets of reference signal resources. The terminal may select a plurality of sets of measurement reference signal resources, and report all CSI corresponding to the plurality of sets of measurement reference signal resources to the base station, so that the base station can manage and coordinate precoding matrices corresponding to measurement reference signal resources of different terminals.

However, a CSI reporting mode specific to each set of measurement reference signal resources is currently configured by the base station. In this case, because candidate measurement reference signal resources are excessive, required CSI report overheads are excessively high, and this solution is not sufficiently flexible.

SUMMARY

Embodiments of the present disclosure provide a CSI sending method, a CSI receiving method, a terminal, and a base station, so as to overcome a prior-art disadvantage of relatively low flexibility.

According to a first aspect, a channel state information (CSI) sending method is provided, including:

selecting, by a terminal, a target channel state information CSI process from N CSI processes; and setting, by the terminal, a CSI reporting mode corresponding to the target CSI process, and sending, based on the CSI reporting mode, a CSI corresponding to the CSI process.

With reference to the first aspect, in a first possible implementation, the CSI reporting mode corresponding to the target CSI process is a first-granularity CSI reporting mode, and the first-granularity CSI reporting mode includes reporting the CSI using a time domain resource granularity and/or a frequency domain resource granularity less than a threshold.

With reference to the first possible implementation of the first aspect, in a second possible implementation, after the determining, by the terminal, a CSI reporting mode corresponding to the target CSI process, before the sending, based on the CSI reporting mode, CSI corresponding to the CSI process, the method further includes:

sending, by the terminal, a first notification message to a base station, where the first notification message is used to notify the base station of the CSI reporting mode corresponding to the target CSI process.

With reference to any one of the first aspect, or the first to the second possible implementations of the first aspect, in a third possible implementation, the method further includes:

determining, by the terminal, that a CSI reporting mode for another CSI process is a second-granularity CSI reporting mode, where the second-granularity CSI reporting mode means reporting CSI by using a time domain resource granularity and/or a frequency domain resource granularity greater than or equal to the threshold, and the another CSI process is a CSI process other than the target CSI process in the N CSI processes.

With reference to the third possible implementation of the first aspect, in a fourth possible implementation, the method further includes:

determining, by the terminal, the CSI reporting mode corresponding to the another CSI process; and sending, by the terminal, a second notification message to the base station, where the second notification message is used to notify the base station of the CSI reporting mode corresponding to the another CSI process.

With reference to any one of the first aspect, or the first to the fourth possible implementations of the first aspect, in a fifth possible implementation, the selecting, by a terminal, a target channel state information CSI process from N CSI processes includes:

for any one of the N CSI processes, performing, by the terminal, channel quality measurement on the basis of a reference signal resource corresponding to the any CSI process, to obtain a channel quality measurement result corresponding to the any CSI process; and selecting, by the terminal, the target CSI process from the N CSI processes based on channel quality measurement results respectively corresponding to the N CSI processes.

With reference to any one of the first aspect, or the first to the fifth possible implementations of the first aspect, in a sixth possible implementation, if the target CSI process includes a first CSI process and a second CSI process, the first CSI process is associated with a first reference signal resource, and the second CSI process is associated with a second reference signal resource; and the determining, by the terminal, a CSI reporting mode corresponding to the target CSI process includes:

determining, by the terminal based on a channel quality measurement result corresponding to the first CSI process and a channel quality measurement result corresponding to the second CSI process, a CSI reporting mode corresponding to the second CSI process.

With reference to the sixth possible implementation of the first aspect, in a seventh possible implementation, the determining, by the terminal based on a channel quality measurement result corresponding to the first CSI process and a channel quality measurement result corresponding to the second CSI process, a CSI reporting mode corresponding to the second CSI process includes:

using, by the terminal based on the channel quality measurement result corresponding to the first CSI process and the channel quality measurement result corresponding to the second CSI process, a differential feedback mode as the CSI reporting mode corresponding to the second CSI process, where the differential feedback mode is a reporting mode of a difference between CSI reporting corresponding to the second CSI process and CSI reporting corresponding to the first CSI process.

With reference to the fifth possible implementation or the sixth possible implementation of the first aspect, in an eighth possible implementation, the method includes:

sending, by the terminal, a third notification message to the base station, where the third notification message is used to notify the base station of the CSI reporting mode corresponding to the second CSI process.

According to a second aspect, a channel state information (CSI) receiving method is provided, including:

receiving, by a base station, a first notification message sent by a terminal; and determining, by the base station based on the first notification message, a CSI reporting mode corresponding to a target CSI process, where the target CSI process is included in N CSI processes.

With reference to the second aspect, in a first possible implementation, the CSI reporting mode corresponding to the target CSI process is a first-granularity CSI reporting mode, and the first-granularity CSI reporting mode includes reporting the CSI using a time domain resource granularity and/or a frequency domain resource granularity less than a threshold.

With reference to the second aspect, or the first possible implementation of the second aspect, in a second possible implementation, the method further includes:

receiving, by the base station, a second notification message; and determining, by the base station based on the second notification message, that a CSI reporting mode for another CSI process is a second-granularity CSI reporting mode, where the second-granularity CSI reporting mode includes reporting the CSI using a time domain resource granularity and/or a frequency domain resource granularity greater than or equal to the threshold, and the another CSI process is a CSI process other than the target CSI process in the N CSI processes.

With reference to any one of the second aspect, or the first to the second possible implementations of the second aspect, in a third possible implementation, if the target CSI process includes a first CSI process and a second CSI process, the first CSI process is associated with a first reference signal resource, and the second CSI process is associated with a second reference signal resource; and the method further includes:

receiving, by the base station, a third notification message, where the third notification message is used to notify the base station of a CSI reporting mode corresponding to the second CSI process, and the CSI reporting mode corresponding to the second CSI process is determined based on a channel quality measurement result corresponding to the first CSI process and a channel quality measurement result corresponding to the second CSI process.

With reference to the third possible implementation of the second aspect, in a fourth possible implementation, the CSI reporting mode corresponding to the second CSI process is a differential feedback mode, and the differential feedback mode is a reporting mode of a difference between CSI reporting corresponding to the second CSI process and CSI reporting corresponding to the first CSI process.

According to a third aspect, a terminal is provided, including:

a processing unit, configured to select a target channel state information (CSI) process from N CSI processes, where the processing unit is further configured to set a CSI reporting mode corresponding to the target CSI process; and a sending unit, configured to send, based on the CSI reporting mode, a CSI corresponding to the CSI process.

With reference to the third aspect, in a first possible implementation, the CSI reporting mode corresponding to the target CSI process is a first-granularity CSI reporting mode, and the first-granularity CSI reporting mode includes reporting the CSI using a time domain resource granularity and/or a frequency domain resource granularity less than a threshold.

With reference to the first possible implementation of the third aspect, in a second possible implementation, the sending unit is further configured to send a first notification message to a base station, where the first notification message is used to notify the base station of the CSI reporting mode corresponding to the target CSI process.

With reference to any one of the third aspect, or the first to the second possible implementations of the third aspect, in a third possible implementation, the processing unit is further configured to determine that a CSI reporting mode for another CSI process is a second-granularity CSI reporting mode, where the second-granularity CSI reporting mode means reporting CSI by using a time domain resource granularity and/or a frequency domain resource granularity greater than or equal to the threshold, and the another CSI process is a CSI process other than the target CSI process in the N CSI processes.

With reference to the third possible implementation of the third aspect, in a fourth possible implementation, the processing unit is further configured to determine the CSI reporting mode corresponding to the another CSI process; and the sending unit is further configured to send a second notification message to the base station, where the second notification message is used to notify the base station of the CSI reporting mode corresponding to the another CSI process.

With reference to any one of the third aspect, or the first to the fourth possible implementations of the third aspect, in a fifth possible implementation, when selecting the target channel state information CSI process from the N CSI processes, the processing unit is configured to:

for any one of the N CSI processes, perform channel quality measurement on the basis of a reference signal resource corresponding to the any one of the N CSI processes, to obtain a channel quality measurement result corresponding to the any one of the N CSI processes; and select the target CSI process from the N CSI processes based on channel quality measurement results respectively corresponding to the N CSI processes.

With reference to any one of the third aspect, or the first to the fifth possible implementations of the third aspect, in a sixth possible implementation, if the target CSI process includes a first CSI process and a second CSI process, the first CSI process is associated with a first reference signal resource, and the second CSI process is associated with a second reference signal resource; and when determining the CSI reporting mode corresponding to the target CSI process, the processing unit is specifically configured to:

determine, based on a channel quality measurement result corresponding to the first CSI process and a channel quality measurement result corresponding to the second CSI process, a CSI reporting mode corresponding to the second CSI process.

With reference to the sixth possible implementation of the third aspect, in a seventh possible implementation, when determining, based on the channel quality measurement result corresponding to the first CSI process and the channel quality measurement result corresponding to the second CSI process, the CSI reporting mode corresponding to the second CSI process, the processing unit is specifically configured to:

use, based on the channel quality measurement result corresponding to the first CSI process and the channel quality measurement result corresponding to the second CSI process, a differential feedback mode as the CSI reporting mode corresponding to the second CSI process, where the differential feedback mode is a reporting mode of a difference between CSI reporting corresponding to the second CSI process and CSI reporting corresponding to the first CSI process.

With reference to the fifth possible implementation or the sixth possible implementation of the third aspect, in an eighth possible implementation, the sending unit is further configured to send a third notification message to the base station, where the third notification message is used to notify the base station of the CSI reporting mode corresponding to the second CSI process.

According to a fourth aspect, a base station is provided, including:

a receiving unit, configured to receive a first notification message sent by a terminal; and a processing unit, configured to determine, based on the first notification message, a CSI reporting mode corresponding to a target CSI process, where the target CSI process is included in N CSI processes.

With reference to the fourth aspect, in a first possible implementation, the CSI reporting mode corresponding to the target CSI process is a first-granularity CSI reporting mode, and the first-granularity CSI reporting mode includes reporting the CSI using a time domain resource granularity and/or a frequency domain resource granularity less than a threshold.

With reference to the fourth aspect, or the first possible implementation of the fourth aspect, in a second possible implementation, the receiving unit is further configured to receive a second notification message; and the processing unit is further configured to determine, based on the second notification message, that a CSI reporting mode for another CSI process is a second-granularity CSI reporting mode, where the second-granularity CSI reporting mode includes reporting the CSI using a time domain resource granularity and/or a frequency domain resource granularity greater than or equal to the threshold, and the another CSI process is a CSI process other than the target CSI process in the N CSI processes.

With reference to any one of the fourth aspect, or the first to the second possible implementations of the fourth aspect, in a third possible implementation, if the target CSI process includes a first CSI process and a second CSI process, the first CSI process is associated with a first reference signal resource, and the second CSI process is associated with a second reference signal resource; and the receiving unit is further configured to receive a third notification message, where the third notification message is used to notify the base station of a CSI reporting mode corresponding to the second CSI process, and the CSI reporting mode corresponding to the second CSI process is determined based on a channel quality measurement result corresponding to the first CSI process and a channel quality measurement result corresponding to the second CSI process.

With reference to the third possible implementation of the fourth aspect, in a fourth possible implementation, the CSI reporting mode corresponding to the second CSI process is a differential feedback mode, and the differential feedback mode is a reporting mode of a difference between CSI reporting corresponding to the second CSI process and CSI reporting corresponding to the first CSI process.

The embodiments of the present disclosure provide CSI sending methods and CSI receiving methods. The terminal selects the target channel state information CSI process from the N CSI processes. The terminal sets the CSI reporting mode corresponding to the target CSI process, and sends, based on the CSI reporting mode, the CSI corresponding to the CSI process. In this solution, the terminal can set a CSI reporting mode corresponding to a CSI process, and send, based on the set CSI reporting mode, a CSI corresponding to the CSI process. However, in the prior art, only the base station configures a CSI reporting mode corresponding to each CSI process. Therefore, flexibility is increased.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

In the following, preferred implementations of the present disclosure are described in detail with reference to the accompanying drawings. It should be understood that the preferred embodiments described herein are merely used to illustrate and explain the present disclosure, but are not intended to limit the present disclosure. In addition, the embodiments of this application and features in the embodiments may be mutually combined if they do not conflict with each other.

The following describes the embodiments of the present disclosure in detail with reference to the accompanying drawings.

Technical solutions described below are applicable to wireless communications systems, for example, an LTE system and a WCDMA (Wideband Code Division Multiple Access) system.

Figure 1:
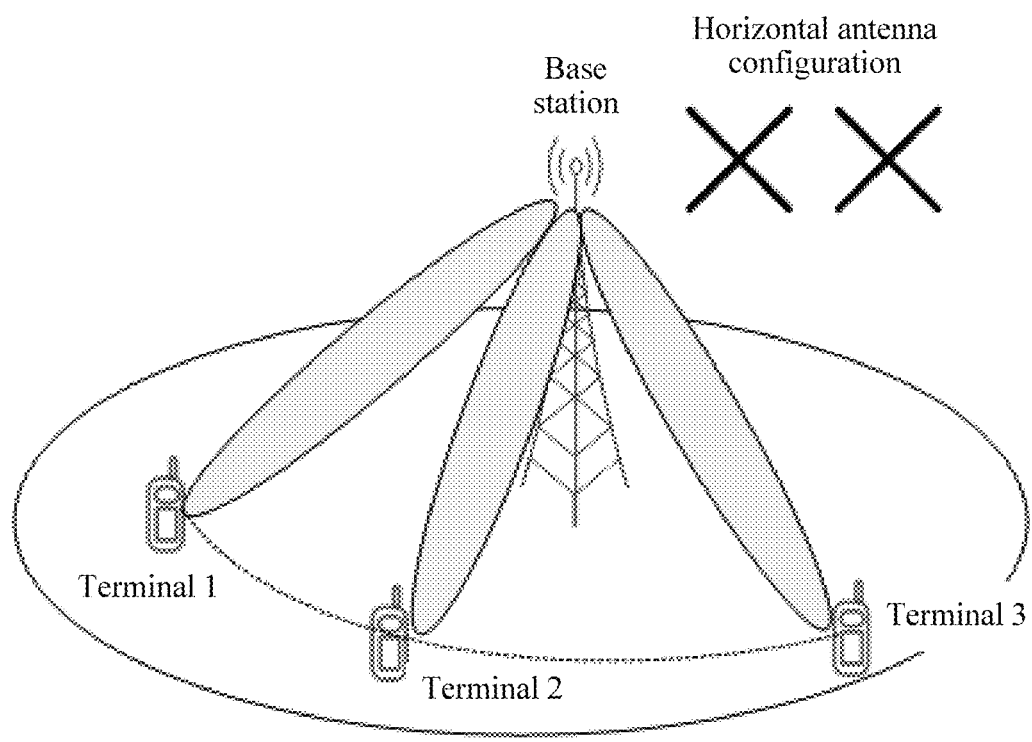
FIG. 1 is a schematic diagram of two-dimensional beamforming in the prior art.
Figure 2:
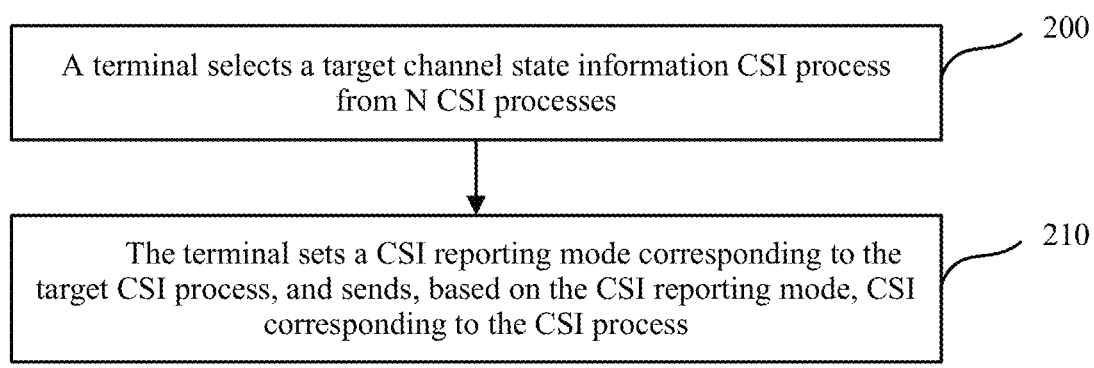
FIG. 2 is a flowchart for sending CSI according to an embodiment of the present disclosure.

As shown in FIG. 2, in an embodiment of the present disclosure, a procedure for sending CSI is as follows:

Step 200: A terminal selects a target channel state information CSI process from N CSI processes.

Step 210: The terminal sets a CSI reporting mode corresponding to the target CSI process, and sends, based on the CSI reporting mode, CSI corresponding to the CSI process.

In this embodiment of the present disclosure, the terminal selects the target CSI process from the N CSI processes. The terminal sets the CSI reporting mode corresponding to the target CSI process, and sends, based on the CSI reporting mode, the CSI corresponding to the CSI process. In this solution, the terminal can set a CSI reporting mode corresponding to a CSI process, and send, based on the set CSI reporting mode, CSI corresponding to the CSI process. However, in the prior art, only a base station configures a CSI reporting mode corresponding to each CSI process. Therefore, flexibility is increased.

To reduce resource overheads and increase resource utilization, in this embodiment of the present disclosure, optionally, the CSI reporting mode corresponding to the target CSI process is a first-granularity CSI reporting mode, and the first-granularity CSI reporting mode means reporting CSI by using a time domain resource granularity and/or a frequency domain resource granularity less than a threshold.

After the determining, by the terminal, a CSI reporting mode corresponding to the target CSI process, before the sending, based on the CSI reporting mode, CSI corresponding to the CSI process, the following operation is further included:

sending, by the terminal, a first notification message to a base station, where the first notification message is used to notify the base station of the CSI reporting mode corresponding to the target CSI process.

It should be noted that when the first notification message is used to notify the CSI reporting mode corresponding to the target CSI process, a specified bit in the first notification message may be specifically used for the notification. For example, the CSI reporting mode used for the CSI reporting is indicated by using an RTI (report type indication) of 1 bit. When the RTI is "0", it indicates that the CSI reporting mode corresponding to the target CSI process is the first-granularity CSI reporting mode. Certainly, alternatively, when the RTI is "1", it may indicate that the CSI reporting mode corresponding to the target CSI process is the first-granularity CSI reporting mode. Certainly, 2 or more bits may be used for description, and this is not specifically limited herein.

In this embodiment of the present disclosure, if there are a plurality of target CSI processes, feedback types of all parameters in CSI reporting modes corresponding to all the target CSI processes may match each other. The matching indicates that the feedback types may be the same or similar.

For example, a CSI reporting mode corresponding to a first target CSI process means feeding back a wideband PMI and a wideband CQI, and a CSI reporting mode corresponding to a second target CSI process means feeding back a wideband PMI, a subband CQI, and a wideband CQI. Each of the CSI reporting modes corresponding to the two target CSI processes includes reporting of a wideband PMI and a wideband CQI. Therefore, the two CSI reporting modes are considered as similar CSI reporting modes. Alternatively, a CSI reporting mode corresponding to a first target CSI process means reporting a wideband PMI and a wideband CQI, and a CSI reporting mode corresponding to a second target CSI process means reporting a wideband PMI and a wideband CQI. Therefore, feedback types of all parameters in the CSI reporting modes corresponding to the two target CSI processes are the same.

In this embodiment of the present disclosure, optionally, the CSI process may be associated with at least one set of measurement reference signal resources.

In this embodiment of the present disclosure, to reduce CSI report overheads and increase resource utilization, the following operation is further included:

determining, by the terminal, that a CSI reporting mode for another CSI process is a second-granularity CSI reporting mode, where the second-granularity CSI reporting mode means reporting CSI by using a time domain resource granularity and/or a frequency domain resource granularity greater than or equal to the threshold, and the another CSI process is a CSI process other than the target CSI process in the N CSI processes.

In this embodiment of the present disclosure, the following operations are further included:

determining, by the terminal, the CSI reporting mode corresponding to the another CSI process; and sending, by the terminal, a second notification message to the base station, where the second notification message is used to notify the base station of the CSI reporting mode corresponding to the another CSI process.

For example, when the terminal reports a relatively large quantity of CSI, feedback overheads of the terminal are high. To reduce overheads for reporting CSI by the terminal, the terminal selects, from P CSI processes, T optimal CSI processes as target CSI processes. The T CSI processes correspond to the first-granularity CSI reporting mode, and (P-T) other CSI processes correspond to the second-granularity CSI reporting mode.

It should be noted that when the second notification message is used to notify the CSI reporting mode corresponding to the another CSI process, a specified bit in the second notification message may be specifically used for the notification. For example, the CSI reporting mode used for the CSI reporting is indicated by using an RTI of 1 bit. When the RTI is "0", it indicates that the CSI reporting mode corresponding to the another CSI process is the second-granularity CSI reporting mode. Certainly, alternatively, when the RTI is "1", it may indicate that the CSI reporting mode corresponding to the another CSI process is the second-granularity CSI reporting mode. Certainly, 2 or more bits may be used for description, and this is not specifically limited herein.

In this embodiment of the present disclosure, a CSI reporting mode for feedback by the terminal may be adaptively changed based on a channel quality measurement result. If a quantity P of CSI processes is 4, the base station may configure CSI reporting modes for the first two CSI processes as a physical uplink control channel (PUCCH) reporting mode 1-1, and configure CSI reporting modes for the last two CSI processes as a PUCCH reporting mode 2-1. That is, each of the CSI reporting modes corresponding to the first two CSI processes is a wideband PMI and a wideband CQI, and each of the CSI reporting modes corresponding to the last two CSI processes is a wideband PMI, a subband CQI, and a wideband CQI. The CSI reporting modes that are for the first two CSI processes and that are configured by the base station are the second-granularity CSI reporting mode, and the CSI reporting modes that are for the last two CSI processes and that are configured by the base station are the first-granularity CSI reporting mode.

If (T=2) optimal CSI processes are selected on the basis of channel quality measurement results corresponding to the (P=4) CSI processes, if the T selected optimal CSI processes are the first two CSI processes in the four processes, the terminal may set the CSI reporting modes for the first two CSI processes to the PUCCH reporting mode 2-1, and set the CSI reporting modes for the last two CSI processes to the PUCCH reporting mode 1-1. The terminal indicates, by using the first notification message, the CSI reporting modes respectively corresponding to the four CSI processes.

When the terminal indicates, by using an RTI of 1 bit in the first notification message, the CSI reporting modes corresponding to the first two CSI processes, optionally, the terminal may further indicate, by using an RTI of 1 bit, the CSI reporting modes corresponding to the last two CSI processes.

In this embodiment of the present disclosure, the RTI and an RI in the CSI may be jointly encoded to form a new CSI report type. Then the terminal reports RTI information corresponding to the new CSI report type to the base station by using a PUCCH. Alternatively, the RTI may be independently encoded to form a new CSI report type. Then the terminal reports RTI information corresponding to the new CSI report type to the base station by using a PUCCH.

In this embodiment of the present disclosure, optionally, the terminal may select the target channel state information CSI process from the N CSI processes in the following manner:

for any one of the N CSI processes, performing, by the terminal, channel quality measurement on the basis of a reference signal resource corresponding to the any CSI process, to obtain a channel quality measurement result corresponding to the any CSI process; and selecting, by the terminal, the target CSI process from the N CSI processes based on channel quality measurement results respectively corresponding to the N CSI processes.

In this embodiment of the present disclosure, optionally, if the target CSI process includes a first CSI process and a second CSI process, the first CSI process is associated with a first reference signal resource, and the second CSI process is associated with a second reference signal resource.

Further, to reduce overheads for feeding back CSI by the terminal and increase resource utilization, optionally, the terminal may determine, in the following manner, the CSI reporting mode corresponding to the target CSI process:

determining, by the terminal based on a channel quality measurement result corresponding to the first CSI process and a channel quality measurement result corresponding to the second CSI process, a CSI reporting mode corresponding to the second CSI process.

If the target CSI process includes the first CSI process and the second CSI process, the first CSI process is associated with the first reference signal resource, and the second CSI process is associated with the second reference signal resource, a current CSI reporting mode is comprehensively determined based on the channel quality measurement result corresponding to the first CSI process and the channel quality measurement result corresponding to the second CSI process. If the terminal finds that a current channel quality measurement result is not better than the channel quality measurement result of the reference signal resource corresponding to the first CSI process, the terminal may not report CSI corresponding to the second CSI process. If a current channel quality measurement result is better than the channel quality measurement result of the reference signal resource corresponding to the first CSI process, the terminal determines the CSI reporting mode corresponding to the second CSI process, and reports, by using the determined CSI reporting mode, CSI corresponding to the second CSI process.

In this embodiment of the present disclosure, optionally, the terminal may determine, in the following manner based on the channel quality measurement result corresponding to the first CSI process and the channel quality measurement result corresponding to the second CSI process, the CSI reporting mode corresponding to the second CSI process:

using, by the terminal based on the channel quality measurement result corresponding to the first CSI process and the channel quality measurement result corresponding to the second CSI process, a differential feedback mode as the CSI reporting mode corresponding to the second CSI process.

The differential feedback mode is a reporting mode of a difference between CSI reporting corresponding to the second CSI process and CSI reporting corresponding to the first CSI process.

That is, optionally, CSI reported at a current moment may be a differential feedback of a reporting result of CSI corresponding to the reference signal resource corresponding to the first CSI process. For example, the terminal reports only a difference between a CQI obtained through measurement at the current moment and a CQI that is obtained through measurement at a previous moment and that is corresponding to the first CSI process. Further, the terminal may also report a PMI obtained through measurement at the current moment. The PMI obtained through measurement at the current moment may be a PMI obtained after a codebook subset limitation is performed on CSI that is obtained through measurement at the previous moment and that is corresponding to the first CSI process.

In this embodiment of the present disclosure, optionally, a quantity of reference signal resources associated with each CSI process may be dynamically or semi-statically changed. Even a quantity of antenna ports corresponding to each associated reference signal resource may be dynamically or semi-statically changed. In addition, different reference signal resources may be corresponding to different quantities of antenna ports.

In this embodiment of the present disclosure, the following operation is further included:

sending, by the terminal, a third notification message to the base station, where the third notification message is used to notify the base station of the CSI reporting mode corresponding to the second CSI process.

Figure 3:
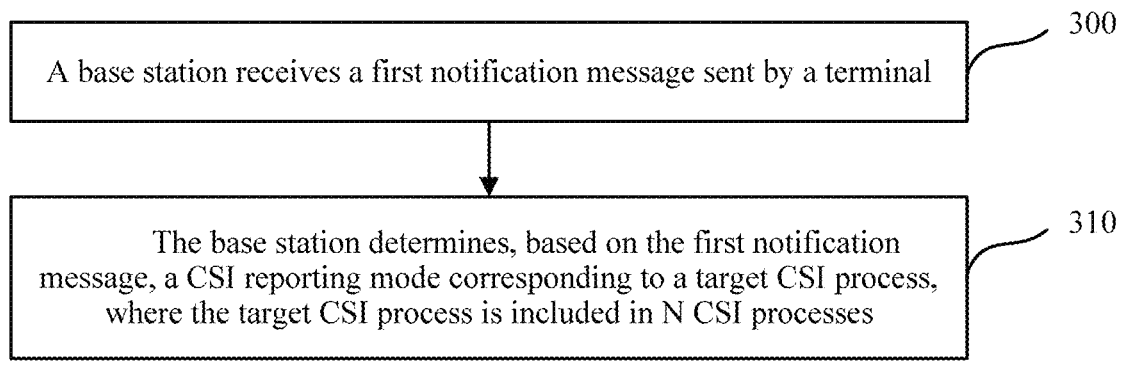
FIG. 3 is another flowchart for receiving CSI according to an embodiment of the present disclosure.

As shown in FIG. 3, in an embodiment of the present disclosure, a procedure for receiving CSI is as follows:

Step 300: A base station receives a first notification message sent by a terminal.

Step 310: The base station determines, based on the first notification message, a CSI reporting mode corresponding to a target CSI process, where the target CSI process is included in N CSI processes.

In this embodiment of the present disclosure, the terminal selects the target CSI process from the N CSI processes. The terminal sets the CSI reporting mode corresponding to the target CSI process, and sends, based on the CSI reporting mode, CSI corresponding to the CSI process. In this solution, the terminal can set a CSI reporting mode corresponding to a CSI process, and send, based on the set CSI reporting mode, a CSI corresponding to the CSI process. However, in the prior art, only the base station configures a CSI reporting mode corresponding to each CSI process. Therefore, flexibility is increased.

To reduce resource overheads and increase resource utilization, in this embodiment of the present disclosure, optionally, the CSI reporting mode corresponding to the target CSI process is a first-granularity CSI reporting mode, and the first-granularity CSI reporting mode includes reporting the CSI using a time domain resource granularity and/or a frequency domain resource granularity less than a threshold.

It should be noted that when the first notification message is used to notify the CSI reporting mode corresponding to the target CSI process, a specified bit in the first notification message may be specifically used for the notification. For example, the CSI reporting mode used for the CSI reporting is indicated by using an RTI (Report Type Indication, report type indication) of 1 bit. When the RTI is "0", it indicates that the CSI reporting mode corresponding to the target CSI process is the first-granularity CSI reporting mode. Certainly, alternatively, when the RTI is "1", it may indicate that the CSI reporting mode corresponding to the target CSI process is the first-granularity CSI reporting mode. Certainly, 2 or more bits may be used for description, and this is not specifically limited herein.

In this embodiment of the present disclosure, if there are a plurality of target CSI processes, feedback types of all parameters in CSI reporting modes corresponding to all the target CSI processes may match each other. The matching indicates that the feedback types may be the same or similar.

For example, a CSI reporting mode corresponding to a first target CSI process means feeding back a wideband PMI and a wideband CQI, and a CSI reporting mode corresponding to a second target CSI process means feeding back a wideband PMI, a wideband CQI, and a subband CQI. Each of the CSI reporting modes corresponding to the two target CSI processes includes reporting of a wideband PMI and a wideband CQI. Therefore, the two CSI reporting modes are considered as similar CSI reporting modes. Alternatively, a CSI reporting mode corresponding to a first target CSI process means reporting a wideband PMI and a wideband CQI, and a CSI reporting mode corresponding to a second target CSI process means reporting a wideband PMI and a wideband CQI. Therefore, feedback types of all parameters in the CSI reporting modes corresponding to the two target CSI processes are the same.

In this embodiment of the present disclosure, optionally, the CSI process may be associated with at least one set of measurement reference signal resources.

In this embodiment of the present disclosure, to reduce CSI report overheads and increase resource utilization, the following operations may be further included:

receiving, by the base station, a second notification message; and determining, by the base station based on the second notification message, that a CSI reporting mode for another CSI process is a second-granularity CSI reporting mode, where the second-granularity CSI reporting mode includes reporting the CSI using a time domain resource granularity and/or a frequency domain resource granularity greater than or equal to the threshold, and the another CSI process is a CSI process other than the target CSI process in the N CSI processes.

For example, when the terminal reports a relatively large quantity of CSI, feedback overheads of the terminal are high. To reduce overheads for reporting CSI by the terminal, the terminal selects, from P CSI processes, T optimal CSI processes as target CSI processes. The T CSI processes are corresponding to the first-granularity CSI reporting mode, and (P-T) other CSI processes are corresponding to the second-granularity CSI reporting mode.

It should be noted that when the second notification message is used to notify the CSI reporting mode corresponding to the another CSI process, a specified bit in the second notification message may be specifically used for the notification. For example, the CSI reporting mode used for the CSI reporting is indicated by using an RTI of 1 bit. When the RTI is "0", it indicates that the CSI reporting mode corresponding to the another CSI process is the second-granularity CSI reporting mode. Certainly, alternatively, when the RTI is "1", it may indicate that the CSI reporting mode corresponding to the another CSI process is the second-granularity CSI reporting mode. Certainly, 2 or more bits may be used for description, and this is not specifically limited herein.

In this embodiment of the present disclosure, a CSI reporting mode for feedback by the terminal may be adaptively changed based on a channel quality measurement result. If a quantity P of CSI processes is 4, the base station may configure CSI reporting modes for the first two CSI processes as a PUCCH reporting mode 1-1, and configure CSI reporting modes for the last two CSI processes as a PUCCH reporting mode 2-1. That is, each of the CSI reporting modes corresponding to the first two CSI processes is a wideband PMI and a wideband CQI, and each of the CSI reporting modes corresponding to the last two CSI processes is a wideband PMI, a subband CQI, and a wideband CQI. The CSI reporting modes that are for the first two CSI processes and that are configured by the base station are the second-granularity CSI reporting mode, and the CSI reporting modes that are for the last two CSI processes and that are configured by the base station are the first-granularity CSI reporting mode.

If (T=2) optimal CSI processes are selected on the basis of channel quality measurement results corresponding to the (P=4) CSI processes, if the T selected optimal CSI processes are the first two CSI processes in the four processes, the terminal may set the CSI reporting modes for the first two CSI processes to the PUCCH reporting mode 2-1, and set the CSI reporting modes for the last two CSI processes to the PUCCH reporting mode 1-1. The terminal indicates, by using the first notification message, the CSI reporting modes respectively corresponding to the four CSI processes.

When the terminal indicates, by using an RTI of 1 bit in the first notification message, the CSI reporting modes corresponding to the first two CSI processes, optionally, the terminal may further indicate, by using an RTI of 1 bit, the CSI reporting modes corresponding to the last two CSI processes.

In this embodiment of the present disclosure, the RTI and an RI in the CSI may be jointly encoded to form a new CSI report type. Then the terminal reports RTI information corresponding to the new CSI report type to the base station by using a PUCCH. Alternatively, the RTI may be independently encoded to form a new CSI report type. Then the terminal reports RTI information corresponding to the new CSI report type to the base station by using a PUCCH.

In this embodiment of the present disclosure, optionally, if the target CSI process includes a first CSI process and a second CSI process, the first CSI process is associated with a first reference signal resource, and the second CSI process is associated with a second reference signal resource.

To reduce overheads for feeding back CSI by the terminal and increase resource utilization, in this embodiment of the present disclosure, the method further includes the following operation:

receiving, by the base station, a third notification message, where the third notification message is used to notify the base station of a CSI reporting mode corresponding to the second CSI process, and the CSI reporting mode corresponding to the second CSI process is determined based on a channel quality measurement result corresponding to the first CSI process and a channel quality measurement result corresponding to the second CSI process.

If the target CSI process includes the first CSI process and the second CSI process, the first CSI process is associated with the first reference signal resource, and the second CSI process is associated with the second reference signal resource, a current CSI reporting mode is comprehensively determined based on the channel quality measurement result corresponding to the first CSI process and the channel quality measurement result corresponding to the second CSI process. If the terminal finds that a current channel quality measurement result is not better than the channel quality measurement result of the reference signal resource corresponding to the first CSI process, the terminal may not report CSI corresponding to the second CSI process. If a current channel quality measurement result is better than the channel quality measurement result of the reference signal resource corresponding to the first CSI process, the terminal determines the CSI reporting mode corresponding to the second CSI process, and sends, by using the determined CSI reporting mode, CSI corresponding to the second CSI process.

In this embodiment of the present disclosure, optionally, the CSI reporting mode corresponding to the second CSI process is a differential feedback mode, and the differential feedback mode is a reporting mode of a difference between CSI reporting corresponding to the second CSI process and CSI reporting corresponding to the first CSI process.

That is, optionally, CSI reported at a current moment may be a differential feedback of a reporting result of CSI corresponding to the reference signal resource corresponding to the first CSI process. For example, the terminal reports only a difference between a CQI obtained through measurement at the current moment and a CQI that is obtained through measurement at a previous moment and that is corresponding to the first CSI process. Further, the terminal may also report a PMI obtained through measurement at the current moment. The PMI obtained through measurement at the current moment may be a PMI obtained after codebook subset limitation is performed on CSI that is obtained through measurement at the previous moment and that is corresponding to the first CSI process.

In this embodiment of the present disclosure, optionally, a quantity of reference signal resources associated with each CSI process may be dynamically or semi-statically changed. Even a quantity of antenna ports corresponding to each associated reference signal resource may be dynamically or semi-statically changed. In addition, different reference signal resources may be corresponding to different quantities of antenna ports.

In this embodiment of the present disclosure, further, the base station receives a third notification message sent by the terminal. The third notification message is used to notify the base station of the CSI reporting mode corresponding to the second CSI process.

Figure 4A:
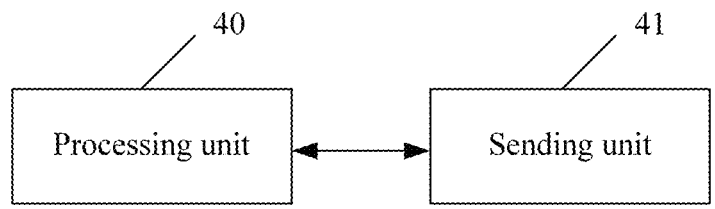
FIG. 4A is a schematic structural diagram of a function of a terminal according to an embodiment of the present disclosure.

As shown in FIG. 4A, an embodiment of the present disclosure provides a terminal. The terminal includes a processing unit 40 and a sending unit 41.

The processing unit 40 is configured to select a target channel state information CSI process from N CSI processes.

The processing unit 40 is further configured to set a CSI reporting mode corresponding to the target CSI process.

The sending unit 41 is configured to send, based on the CSI reporting mode, CSI corresponding to the CSI process.

In this embodiment of the present disclosure, optionally, the CSI reporting mode corresponding to the target CSI process is a first-granularity CSI reporting mode, and the first-granularity CSI reporting mode includes reporting the CSI using a time domain resource granularity and/or a frequency domain resource granularity less than a threshold.

In this embodiment of the present disclosure, the sending unit 41 is further configured to send a first notification message to a base station, where the first notification message is used to notify the base station of the CSI reporting mode corresponding to the target CSI process.

In this embodiment of the present disclosure, the processing unit 40 is further configured to determine that a CSI reporting mode for another CSI process is a second-granularity CSI reporting mode, where the second-granularity CSI reporting mode means reporting CSI by using a time domain resource granularity and/or a frequency domain resource granularity greater than or equal to the threshold, and the another CSI process is a CSI process other than the target CSI process in the N CSI processes.

In this embodiment of the present disclosure, the processing unit 40 is further configured to determine the CSI reporting mode corresponding to the another CSI process.

The sending unit 41 is further configured to send a second notification message to the base station, where the second notification message is used to notify the base station of the CSI reporting mode corresponding to the another CSI process.

In this embodiment of the present disclosure, optionally, when selecting the target CSI process from the N CSI processes, the processing unit 40 is specifically configured to:

for any one of the N CSI processes, perform channel quality measurement on the basis of a reference signal resource corresponding to the any one of the N CSI processes, to obtain a channel quality measurement result corresponding to the any one of the N CSI processes; and select the target CSI process from the N CSI processes based on channel quality measurement results respectively corresponding to the N CSI processes.

In this embodiment of the present disclosure, optionally, if the target CSI process includes a first CSI process and a second CSI process, the first CSI process is associated with a first reference signal resource, and the second CSI process is associated with a second reference signal resource.

When determining the CSI reporting mode corresponding to the target CSI process, the processing unit 40 is configured to:

determine, based on a channel quality measurement result corresponding to the first CSI process and a channel quality measurement result corresponding to the second CSI process, a CSI reporting mode corresponding to the second CSI process.

In this embodiment of the present disclosure, optionally, when determining, based on the channel quality measurement result corresponding to the first CSI process and the channel quality measurement result corresponding to the second CSI process, the CSI reporting mode corresponding to the second CSI process, the processing unit 40 is specifically configured to:

use, based on the channel quality measurement result corresponding to the first CSI process and the channel quality measurement result corresponding to the second CSI process, a differential feedback mode as the CSI reporting mode corresponding to the second CSI process.

The differential feedback mode is a reporting mode of a difference between CSI reporting corresponding to the second CSI process and CSI reporting corresponding to the first CSI process.

In this embodiment of the present disclosure, the sending unit 41 is further configured to send a third notification message to the base station, where the third notification message is used to notify the base station of the CSI reporting mode corresponding to the second CSI process.

Figure 4B:
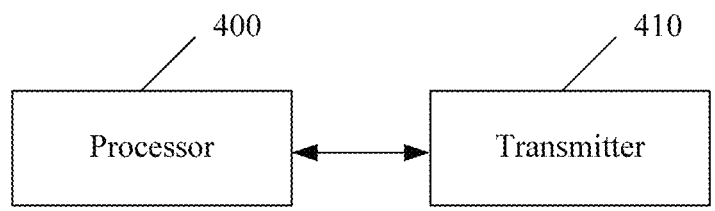
FIG. 4B is another schematic structural diagram of a function of a terminal according to an embodiment of the present disclosure.

As shown in FIG. 4B, an embodiment of the present disclosure provides a terminal. The terminal includes a processor 400 and a transmitter 410.

The processor 400 is configured to select a target CSI process from N CSI processes.

The processor 400 is further configured to set a CSI reporting mode corresponding to the target CSI process.

The transmitter 410 is configured to send, based on the CSI reporting mode, a CSI corresponding to the CSI process.

It should be noted that the processor 400 is further configured to perform other operations performed by the processing unit 40, and the transmitter 410 is further configured to perform other operations performed by the sending unit 41.

Figure 5A:
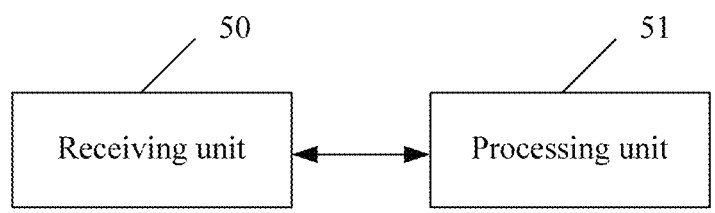
FIG. 5A is a schematic structural diagram of a function of a base station according to an embodiment of the present disclosure.

As shown in FIG. 5A, an embodiment of the present disclosure provides a base station. The base station includes a receiving unit 50 and a processing unit 51.

The receiving unit 50 is configured to receive a first notification message sent by a terminal.

The processing unit 51 is configured to determine, based on the first notification message, a CSI reporting mode corresponding to a target CSI process, where the target CSI process is included in N CSI processes.

Optionally, the CSI reporting mode corresponding to the target CSI process is a first-granularity CSI reporting mode, and the first-granularity CSI reporting mode includes reporting the CSI using a time domain resource granularity and/or a frequency domain resource granularity less than a threshold.

The receiving unit 50 is further configured to receive a second notification message.

The processing unit 51 is further configured to determine, based on the second notification message, that a CSI reporting mode for another CSI process is a second-granularity CSI reporting mode, where the second-granularity CSI reporting mode includes reporting the CSI using a time domain resource granularity and/or a frequency domain resource granularity greater than or equal to the threshold, and the another CSI process is a CSI process other than the target CSI process in the N CSI processes.

Optionally, if the target CSI process includes a first CSI process and a second CSI process, the first CSI process is associated with a first reference signal resource, and the second CSI process is associated with a second reference signal resource.

The receiving unit 50 is further configured to receive a third notification message, where the third notification message is used to notify the base station of a CSI reporting mode corresponding to the second CSI process, and the CSI reporting mode corresponding to the second CSI process is determined based on a channel quality measurement result corresponding to the first CSI process and a channel quality measurement result corresponding to the second CSI process.

Optionally, the CSI reporting mode corresponding to the second CSI process is a differential feedback mode, and the differential feedback mode is a reporting mode of a difference between CSI reporting corresponding to the second CSI process and CSI reporting corresponding to the first CSI process.

Figure 5B:
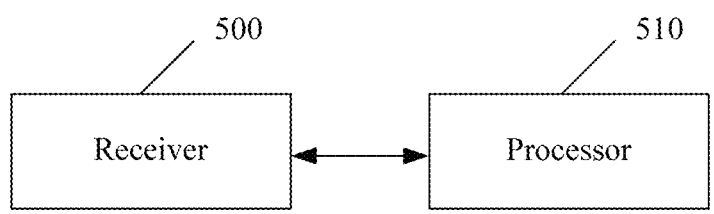
FIG. 5B is another schematic structural diagram of a function of a base station according to an embodiment of the present disclosure.

As shown in FIG. 5B, an embodiment of the present disclosure provides a base station. The base station includes a receiver 500 and a processor 510.

The receiver 500 is configured to receive a first notification message sent by a terminal.

The processor 510 is configured to determine, based on the first notification message, a CSI reporting mode corresponding to a target CSI process, where the target CSI process is included in N CSI processes.

It should be noted that the receiver 500 is further configured to perform other operations performed by the receiving unit 50, and the processor 510 is further configured to perform other operations performed by the processing unit 51.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

The invention claimed is:

1. A channel state information (CSI) sending method, comprising:
    selecting, by a terminal, a target CSI process from N CSI processes, wherein the selecting a target CSI process from N CSI processes comprises selecting, from P CSI processes, T optimal CSI processes as target CSI processes, wherein the T CSI processes correspond to a first-granularity CSI reporting mode, and wherein (P-T) other CSI processes correspond to a second-granularity reporting mode; and
    setting, by the terminal, a CSI reporting mode corresponding to the target CSI process, and sending, based on the CSI reporting mode, a CSI corresponding to the CSI process.

2. The method according to claim 1, wherein the CSI reporting mode corresponding to the target CSI process is the first-granularity CSI reporting mode, and the first-granularity CSI reporting mode includes reporting the CSI using a time domain resource granularity and/or a frequency domain resource granularity less than a threshold of the resource granularity.

3. The method according to claim 2, after the setting, by the terminal, a CSI reporting mode corresponding to the target CSI process, before the sending, based on the CSI reporting mode, the CSI corresponding to the CSI process, further comprising:
    sending, by the terminal, a first notification message to a base station, wherein the first notification message is used to notify the base station of the CSI reporting mode corresponding to the target CSI process.

4. The method according to claim 1, wherein the method further comprises:
    determining, by the terminal, that a CSI reporting mode for another CSI process is the second-granularity CSI reporting mode, wherein the second-granularity CSI reporting mode includes reporting the CSI using a time domain resource granularity and/or a frequency domain resource granularity greater than or equal to the threshold, and the another CSI process is a CSI process other than the target CSI process in the N CSI processes.

5. The method according to claim 4, wherein the method further comprises:
    determining, by the terminal, the CSI reporting mode corresponding to the another CSI process; and
    sending, by the terminal, a second notification message to the base station, wherein the second notification message is used to notify the base station of the CSI reporting mode corresponding to the another CSI process.

6. The method according to claim 1, wherein the selecting, by a terminal, a target CSI process from N CSI processes comprises:
    for any one of the N CSI processes, performing, by the terminal, channel quality measurement on the basis of a reference signal resource corresponding to the any one of the N CSI processes, to obtain a channel quality measurement result corresponding to the any one of the N CSI processes; and
    selecting, by the terminal, the target CSI process from the N CSI processes based on channel quality measurement results respectively corresponding to the N CSI processes.

7. A terminal, comprising:
    a processor, configured to select a target channel state information (CSI) process from N CSI processes, and to set a CSI reporting mode corresponding to the target CSI process; and
    a transmitter, configured to send, based on the CSI reporting mode, the CSI corresponding to the CSI process,
    wherein the processor is further configured to select the target CSI process from the N CSI processes by selecting, from P CSI process, T optimal CSI processes as target CSI processes, wherein the T CSI processes correspond to a first-granularity CSI reporting mode, and wherein (P-T) other CSI processes correspond to a second-granularity reporting mode.

8. The terminal according to claim 7, wherein the CSI reporting mode corresponding to the target CSI process is the first-granularity CSI reporting mode, and the first-granularity CSI reporting mode includes reporting the CSI using a time domain resource granularity and/or a frequency domain resource granularity less than a threshold of the resource granularity.

9. The terminal according to claim 8, wherein the transmitter is further configured to send a first notification message to a base station, wherein the first notification message is used to notify the base station of the CSI reporting mode corresponding to the target CSI process.

10. The terminal according to claim 7, wherein the processor is further configured to determine that a CSI reporting mode for another CSI process is the second-granularity CSI reporting mode, wherein the second-granularity CSI reporting mode includes reporting the CSI using a time domain resource granularity and/or a frequency domain resource granularity greater than or equal to the threshold, and the another CSI process is a CSI process other than the target CSI process in the N CSI processes.

11. The terminal according to claim 10, wherein the processor is further configured to determine the CSI reporting mode corresponding to the another CSI process; and
the transmitter is further configured to send a second notification message to the base station, wherein the second notification message is used to notify the base station of the CSI reporting mode corresponding to the another CSI process.

12. The terminal according to claim 7, wherein when selecting the target CSI process from the N CSI processes, the processor is configured to:
for any one of the N CSI processes, perform channel quality measurement on the basis of a reference signal resource corresponding to the any CSI process, to obtain a channel quality measurement result corresponding to the any one of the N CSI processes; and
select the target CSI process from the N CSI processes based on channel quality measurement results respectively corresponding to the N CSI processes.

13. The terminal according to claim 7, wherein if the target CSI process comprises a first CSI process and a second CSI process, the first CSI process is associated with a first reference signal resource, and the second CSI process is associated with a second reference signal resource; and
when determining the CSI reporting mode corresponding to the target CSI process, the processor is configured to:
determine, based on a channel quality measurement result corresponding to the first CSI process and a channel quality measurement result corresponding to the second CSI process, a CSI reporting mode corresponding to the second CSI process.

14. The terminal according to claim 13, wherein when determining, based on the channel quality measurement result corresponding to the first CSI process and the channel quality measurement result corresponding to the second CSI process, the CSI reporting mode corresponding to the second CSI process, the processor is configured to:
use, based on the channel quality measurement result corresponding to the first CSI process and the channel quality measurement result corresponding to the second CSI process, a differential feedback mode as the CSI reporting mode corresponding to the second CSI process, wherein the differential feedback mode is a reporting mode of a difference between CSI reporting corresponding to the second CSI process and CSI reporting corresponding to the first CSI process.

15. The terminal according to claim 12, wherein the transmitter is further configured to send a third notification message to the base station, wherein the third notification message is used to notify the base station of the CSI reporting mode corresponding to the second CSI process.

16. A base station, comprising:
a receiver, configured to receive a first notification message sent by a terminal; and
a processor, configured to determine, based on the first notification message, a channel state information (CSI) reporting mode corresponding to a target CSI process, wherein the target CSI process is comprised in N CSI processes,
wherein the target CSI process is selected by the terminal from the N CSI processes by selecting, from P CSI processes, T optimal CSI processes, wherein the T CSI processes correspond to a first-granularity CSI reporting mode, and wherein (P-T) other CSI processes correspond to a second granularity reporting mode.

17. The base station according to claim 16, wherein the CSI reporting mode corresponding to the target CSI process is the first-granularity CSI reporting mode, and the first-granularity CSI reporting mode includes reporting the CSI using a time domain resource granularity and/or a frequency domain resource granularity less than a threshold of the resource granularity.

18. The base station according to claim 16, wherein the receiver is further configured to receive a second notification message; and
the receiver is further configured to determine, based on the second notification message, that a CSI reporting mode for another CSI process is the second-granularity CSI reporting mode, wherein the second-granularity CSI reporting mode includes reporting the CSI using a time domain resource granularity and/or a frequency domain resource granularity greater than or equal to the threshold, and the another CSI process is a CSI process other than the target CSI process in the N CSI processes.

19. The base station according to claim 16, wherein if the target CSI process comprises a first CSI process and a second CSI process, the first CSI process is associated with a first reference signal resource, and the second CSI process is associated with a second reference signal resource; and
the receiver is further configured to receive a third notification message, wherein the third notification message is used to notify the base station of a CSI reporting mode corresponding to the second CSI process, and the CSI reporting mode corresponding to the second CSI process is determined based on a channel quality measurement result corresponding to the first CSI process and a channel quality measurement result corresponding to the second CSI process.

20. The base station according to claim 19, wherein the CSI reporting mode corresponding to the second CSI process is a differential feedback mode, and the differential feedback mode is a reporting mode of a difference between CSI reporting corresponding to the second CSI process and CSI reporting corresponding to the first CSI process.

* * * * *